US010855480B2

(12) United States Patent
Lentczner et al.

(10) Patent No.: US 10,855,480 B2
(45) Date of Patent: *Dec. 1, 2020

(54) SYSTEMS AND METHODS FOR PROCESSING PACKETS IN A COMPUTER NETWORK

(71) Applicant: Google LLC, Mountain View, CA (US)

(72) Inventors: Mark Lentczner, Mountain View, CA (US); Zhiwei Cen, San Jose, CA (US); James Michael Bennett, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,889

(22) Filed: Jan. 10, 2019

(65) Prior Publication Data

US 2019/0149345 A1 May 16, 2019

Related U.S. Application Data

(63) Continuation of application No. 14/854,939, filed on Sep. 15, 2015, now Pat. No. 10,187,218.

(51) Int. Cl.
*H04L 12/18* (2006.01)
*H04L 12/721* (2013.01)
(Continued)

(52) U.S. Cl.
CPC .............. *H04L 12/18* (2013.01); *H04L 45/66* (2013.01); *H04L 61/2007* (2013.01);
(Continued)

(58) Field of Classification Search
CPC ......... H04L 12/18; H04L 45/66; H04L 49/25; H04L 49/30; H04L 61/2007; H04L 61/6022; H04L 69/22

See application file for complete search history.

(56) References Cited

U.S. PATENT DOCUMENTS 6,807,175 B1 * 10/2004 Jennings ................. H04L 12/18
370/390
7,089,293 B2 8/2006 Grosner et al.
(Continued)

FOREIGN PATENT DOCUMENTS

CN 101102264 A 1/2008
CN 101409685 A 4/2009
(Continued)

OTHER PUBLICATIONS

International Search Report and Written Opinion dated Nov. 18, 2016 in PCT Application No. PCT/US2016/051734.
(Continued)

*Primary Examiner* — Asad M Nawaz
*Assistant Examiner* — Kai Chang
(74) *Attorney, Agent, or Firm* — Lerner, David, Littenberg, Krumholz & Mentlik, LLP

(57) ABSTRACT

This disclosure provides systems and methods for processing packets. A system can include first computing device, a second computing device, and a first packet forwarding device. Each of the first computing device and the second computing device can be communicatively coupled to a respective port of the first packet forwarding device. Each port of the first packet forwarding device can be assigned a unique MAC address. For a first packet received from the first computing device, the first packet forwarding device can be configured to determine that a destination MAC address of the first packet matches the MAC address assigned to the port on which the first packet was received, and to forward the first packet to the second computing device, responsive to the determination. For a second packet received from the second computing device, the first packet forwarding device can be configured to forward the second
(Continued)

packet via the port whose MAC address matches a source MAC address of the second packet.

20 Claims, 5 Drawing Sheets

(51) Int. Cl.
| | | |
|---|---|---|
| *H04L 29/12* | (2006.01) | |
| *H04L 29/06* | (2006.01) | |
| *H04L 12/947* | (2013.01) | |
| *H04L 12/935* | (2013.01) | |

(52) U.S. Cl.
CPC .......... *H04L 61/6022* (2013.01); *H04L 69/22* (2013.01); *H04L 49/25* (2013.01); *H04L 49/30* (2013.01)

(56) References Cited

U.S. PATENT DOCUMENTS

| | | | |
|---|---|---|---|
| 7,089,326 | B2 | 8/2006 | Boucher et al. |
| 7,283,525 | B2 | 10/2007 | Burgess et al. |
| 7,463,639 | B1 | 12/2008 | Rekhter |
| 7,957,332 | B1 | 6/2011 | Chow et al. |
| 8,175,107 | B1 | 5/2012 | Yalagandula et al. |
| 8,605,727 | B1 | 12/2013 | Bishara |
| 9,065,662 | B1 | 6/2015 | Bishara |
| 9,167,031 | B2 | 10/2015 | Takashima |
| 9,172,641 | B2 | 10/2015 | Liu et al. |
| 9,294,396 | B2* | 3/2016 | Sundaram ............. H04L 45/302 |
| 9,729,431 | B1* | 8/2017 | Orr ......................... H04L 45/24 |
| 9,942,144 | B1* | 4/2018 | Ramalingam ......... H04L 45/245 |
| 2003/0016624 | A1* | 1/2003 | Bare ................. H04L 29/12009 |
| | | | 370/217 |
| 2004/0160904 | A1 | 8/2004 | Enomoto et al. |
| 2004/0218596 | A1 | 11/2004 | Tagore-Brage et al. |
| 2005/0195816 | A1 | 9/2005 | Sumiyoshi |
| 2006/0098589 | A1* | 5/2006 | Kreeger .................. H04L 45/48 |
| | | | 370/256 |
| 2006/0165108 | A1 | 7/2006 | Uysal |
| 2007/0086361 | A1 | 4/2007 | Allan et al. |
| 2008/0008182 | A1 | 1/2008 | Deng |
| 2009/0135722 | A1* | 5/2009 | Boers ...................... H04L 45/00 |
| | | | 370/236 |
| 2010/0067374 | A1* | 3/2010 | Elangovan .......... H04L 12/1886 |
| | | | 370/230 |
| 2010/0192218 | A1 | 7/2010 | Shah et al. |
| 2010/0246402 | A1 | 9/2010 | Komagata |
| 2010/0246583 | A1 | 9/2010 | Morinaga et al. |
| 2011/0007744 | A1 | 1/2011 | Melman et al. |
| 2011/0066756 | A1 | 3/2011 | Kakumaru |
| 2012/0044837 | A1 | 2/2012 | Fernandez et al. |
| 2012/0163174 | A1* | 6/2012 | Shukla ................. H04L 49/357 |
| | | | 370/235 |
| 2012/0257507 | A1 | 10/2012 | Sato et al. |
| 2013/0003737 | A1* | 1/2013 | Sinicrope ................ H04L 45/66 |
| | | | 370/392 |
| 2013/0064246 | A1* | 3/2013 | Dharmapurikar ... H04L 49/3009 |
| | | | 370/392 |
| 2013/0243005 | A1 | 9/2013 | Miyazaki |
| 2014/0044130 | A1 | 2/2014 | Banavalikar et al. |
| 2014/0241353 | A1 | 8/2014 | Zhang et al. |
| 2014/0269380 | A1 | 9/2014 | Rusak et al. |
| 2014/0269710 | A1* | 9/2014 | Sundaram ............. H04L 45/302 |
| | | | 370/392 |
| 2014/0301403 | A1 | 10/2014 | Yabe |
| 2015/0172190 | A1 | 6/2015 | Song |
| 2015/0172222 | A1 | 6/2015 | Liao et al. |
| 2015/0222533 | A1 | 8/2015 | Birrittella et al. |
| 2015/0271303 | A1 | 9/2015 | Neginhal et al. |
| 2015/0319089 | A1* | 11/2015 | Liu ........................ H04L 45/745 |
| | | | 370/392 |
| 2015/0334057 | A1* | 11/2015 | Gao ....................... H04L 49/557 |
| | | | 370/392 |
| 2016/0087893 | A1 | 3/2016 | Nedunchezhian et al. |
| 2016/0204959 | A1 | 7/2016 | Liang et al. |
| 2016/0285820 | A1 | 9/2016 | Tan et al. |
| 2017/0005921 | A1 | 1/2017 | Liu et al. |
| 2017/0078115 | A1* | 3/2017 | Zhou ................... H04L 12/6418 |
| 2018/0097746 | A1 | 4/2018 | Zhang et al. |

FOREIGN PATENT DOCUMENTS

| | | |
|---|---|---|
| CN | 102027767 A | 4/2011 |
| JP | 2014533001 A | 12/2014 |
| WO | 2013039643 A1 | 3/2013 |
| WO | 2013057960 A1 | 4/2013 |
| WO | 2015095996 A1 | 7/2015 |

OTHER PUBLICATIONS

International Preliminary Report on Patentability (Chapter II) dated Sep. 8, 2017 in PCT Application No. PCT/US2016/051734.
Office Action dated Mar. 21, 2017 in U.S. Appl. No. 14/854,939.
Office Action dated Oct. 5, 2017 in U.S. Appl. No. 14/854,939.
Office Action dated Apr. 3, 2018 in U.S. Appl. No. 14/854,939.
Notice of Allowance dated Sep. 14, 2018 in U.S. Appl. No. 14/854,939.
Korean Office Action dated Dec. 13, 2018 in Korean Patent Application No. 10-2018-7001190, and English translation thereof.
Decision for Rejection for Japanese Patent Application No. 2017-566100 dated Sep. 24, 2019.
Notification of the First Office Action for Chinese Patent Application No. 201680038670.X dated Mar. 17, 2020. 6 pages.
Taiwan Office Action for Application No. 105129998.0 dated Jan. 22, 2020, 6 pages.

* cited by examiner

SYSTEMS AND METHODS FOR PROCESSING PACKETS IN A COMPUTER NETWORK

RELATED APPLICATIONS

The present application is a continuation of, and claims priority to and the benefit of, U.S. patent application Ser. No. 14/854,939, filed on Sep. 15, 2015, the entire contents of which are hereby incorporated by reference for all purposes.

BACKGROUND

Information is transmitted over computer networks. The information is represented as bits divided into packets. The packets are passed from between network devices, such as switches and routers, propagating the information through the computer networks. Each packet is transmitted from its source towards a destination specified by header information in the respective packet. The source and destination of a packet may respectively be in different portions of the network. There may be multiple possible routes between the source and destination.

SUMMARY

In some aspects, the disclosure relates to a system. The system can include a first computing device, a second computing device, and a first packet forwarding device. Each of the first computing device and the second computing device can be communicatively coupled to a respective port of the first packet forwarding device. For a first packet received from the first computing device, the first packet forwarding device can be configured to determine that a destination MAC address of the first packet is associated with the port on which the first packet was received. The first packet forwarding device also can be configured to forward the first packet to the second computing device, responsive to the determination that the destination MAC address of the first packet is associated with the port on which the first packet was received. For a second packet received from the second computing device, the first packet forwarding device can be configured to forward the second packet via the port associated with a source MAC address of the second packet.

In some implementations, the first packet forwarding device is further configured to drop the second packet, responsive to determining that the source MAC address of the second packet is not associated with any port of the first packet forwarding device. In some implementations, for a third packet received from the first computing device, the first packet forwarding device is configured to determine that the third packet is one of a broadcast packet and a multicast packet, change a destination MAC address of the third packet to a MAC address assigned to the port on which the third packet was received, and forward the third packet to the second computing device.

In some implementations, a MAC address assigned to at least one port of the first packet forwarding device is based on an IP address of the first packet forwarding device and a number uniquely identifying the at least one port. In some implementations, a MAC address assigned to at least one port of the first packet forwarding device includes the IP address of the first packet forwarding device and the number uniquely identifying the at least one port.

In some implementations, the first packet forwarding device is further configured to determine that a destination MAC address of a fourth packet received from the first computing device is not associated with the port on which the fourth packet was received and that the destination MAC address of the fourth packet is neither a broadcast MAC address nor a multicast MAC address, and drop the fourth packet, responsive to the determination that the destination MAC address of the fourth packet is not associated with the port on which the fourth packet was received and that the destination MAC address of the fourth packet is neither a broadcast MAC address nor a multicast MAC address.

In some implementations, the system can include a third computing device including a plurality of ports. The third computing device can be communicatively coupled to a respective port of the first packet forwarding device. The first packet forwarding device can be further configured to determine that a destination MAC address of a fifth packet received from the third computing device is associated with a device ID of the third computing device. The first packet forwarding device also can be further configured to forward the fifth packet to the second computing device, responsive to determining that the destination MAC address of a fifth packet is associated with the device ID of the third computing device.

In some implementations, the third computing device is configured to determine that a source MAC address of a sixth packet received from the first packet forwarding device is associated with the port of the first packet forwarding device to which the third computing device is communicatively coupled and forward the sixth packet via the port of the third computing device that is associated with the source MAC address of the sixth packet. In some implementations, the first computing device is further configured to ensure that each packet destined for the second computing device has a destination MAC address that is associated with the port of the first packet forwarding device to which the first computing device is communicatively coupled. In some implementations, the second computing device is further configured to ensure that each packet destined for the first computing device has a source MAC address that is associated with the port of the first packet forwarding device to which the first computing device is communicatively coupled.

In some aspects, the disclosure relates to a method of processing packets. The method can include receiving, by a first packet forwarding device, a first packet from a first computing device. The method can include determining, by the first packet forwarding device, that a destination MAC address of the first packet is associated with the port on which the first packet was received. The method can include forwarding, by the first packet forwarding device, the first packet to a second computing device, responsive to the determination that the destination MAC address of the first packet is associated with the port on which the first packet was received. The method can include transmitting, by the second computing device, a second packet to the first packet forwarding device. The method can include forwarding, by the first packet forwarding device, the second packet via the port associated with a source MAC address of the second packet.

In some implementations, the method can include determining, by the first packet forwarding device, that a source MAC address of the second packet is not associated with any port of the first packet forwarding device and dropping, by the first packet forwarding device, the second packet, responsive to the determination that the source MAC address of the second packet is not associated with any port of the first packet forwarding device.

In some implementations, the method can include receiving, by the first packet forwarding device, a third packet to from the first computing device. The method can include determining, by the first packet forwarding device, that the third packet is one of a broadcast packet and a multicast packet. The method can include changing, by the first packet forwarding device, a destination MAC address of the third packet to a MAC address assigned to the port on which the third packet was received. The method can include forwarding, by the first packet forwarding device, the third packet to the second computing device.

In some implementations, a MAC address assigned to at least one port of the first packet forwarding device is based on an IP address of the first packet forwarding device and a number uniquely identifying the at least one port. In some implementations, a MAC address assigned to at least one port of the first packet forwarding device includes the IP address of the first packet forwarding device and the number uniquely identifying the at least one port.

In some implementations, the method can include receiving, by the first packet forwarding device, a fourth packet from the first computing device. The method can include determining, by the first packet forwarding device, that a destination MAC address of the fourth packet is not associated with the port on which the fourth packet was received and that the destination MAC address of the fourth packet is neither a broadcast MAC address nor a multicast MAC address. The method can include dropping, by the first packet forwarding device, the fourth packet, responsive to the determination that the destination MAC address of the fourth packet is not associated with the port on which the fourth packet was received and that the destination MAC address of the fourth packet is neither a broadcast MAC address nor a multicast MAC address.

In some implementations, the method can include receiving, by the first packet forwarding device, a fifth packet from a third computing device. The third computing device can include a plurality of ports. The method can include determining, by the first packet forwarding device, that a destination MAC address of the fifth packet received from the third computing device is associated with a device ID of the third computing device. The method can include forwarding, by the first packet forwarding device, the fifth packet to the second computing device, responsive to determining that the destination MAC address of a fifth packet is associated with the device ID of the third computing device.

In some implementations, the method can include transmitting, by the first packet forwarding device, a sixth packet to the third computing device. The method can include determining, by the third computing device, that a source MAC address of a sixth packet received from the first packet forwarding device is associated with the port of the first packet forwarding device to which the third computing device is communicatively coupled. The method can include forwarding, by the third computing device, the packet via the port of the third computing device that is associated with the source MAC address of the sixth packet.

In some implementations, the method can include ensuring, by the first computing device, that each packet destined for the second computing device has a destination MAC address that is associated with the port of the first packet forwarding device to which the first computing device is communicatively coupled. In some implementations, the method can include ensuring, by the second computing device, that each packet destined for the first computing device has a source MAC address that is associated with the port of the first packet forwarding device to which the first computing device is communicatively coupled.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

The systems and methods of the disclosure relate to packet processing. Particularly, the disclosure describes a type of packet forwarding device that can improve network security by providing port-level control of packets sent between host devices and routing devices. The packet forwarding device can include a number of downward ports and a single upward port, and can forward all packets between the downward ports and the upward port in a manner that allows the upstream device to be certain of the provenance of each packet it receives from the host devices. In general, provenance of a packet can refer to the origin of the packet and the set of downward ports of packet forwarding devices through which the packet traveled on its way to the upstream device. The upstream device and the packet forwarding devices also can be configured to allow the upstream device to select the set of ports of packet forwarding devices through which a packet transmitted by the upstream device will egress.

Figure 1A:
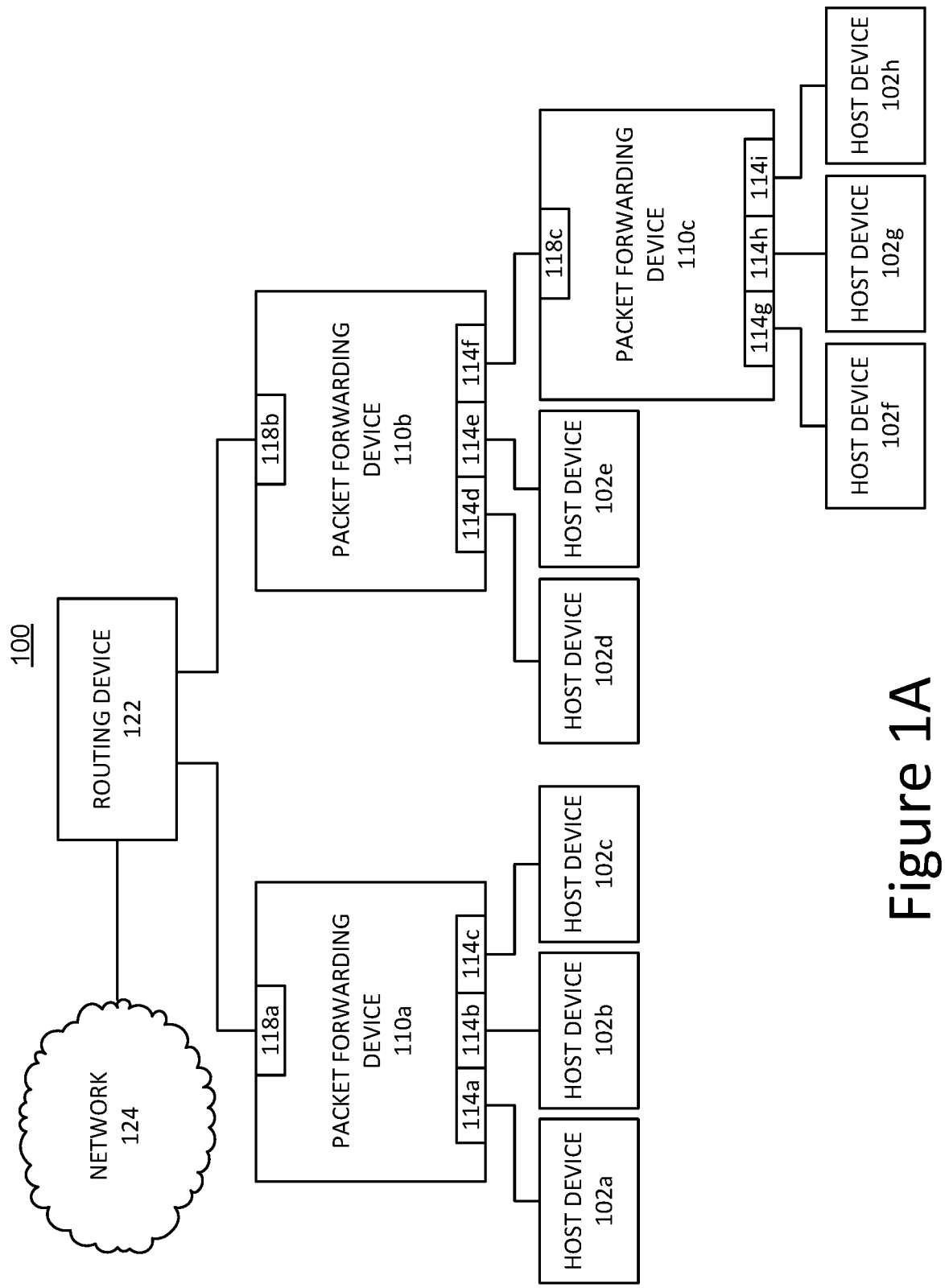
FIG. 1A is a block diagram of an example system for forwarding packets.

FIG. 1A is a block diagram of an example system 100 for forwarding packets. The system 100 includes a plurality of host devices 102a-102h (generally referred to as host devices 102), three packet forwarding devices 110a-110c (generally referred to as packet forwarding devices 110), and a routing device 122. The system 100 also includes a network 124 connected to the routing device 122. In some implementations, the network 124 can be a large external computer network, such as the Internet. For example, the routing device 122 can be a gateway device of an enterprise network that provides Internet access to the host devices 102. In some other implementations, the network 124 can be a different computer network.

The packet forwarding device 110a includes three downward ports 114a-114c and one upward port 118a. Similarly, the packet forwarding device 110b includes three downward ports 114d-114f and one upward port 118b, and the packet forwarding device 110c includes three downward ports 114g-114i and one upward port 118c. The downward ports 114a-114i are generally referred to as downward ports 114, while the upward ports 118a-118c are generally referred to as upward ports 118. The labeling of a port as either an "upward" port or a "downward" port does not refer to the direction in which packets may be traveling through the ports. Instead, it refers to the relative position of the ports with respect to the overall hierarchy of the system 100. Thus, updward ports 118 are positioned closer to the routing device 122, while downward ports 114 are positioned closer to the host devices 102.

The packet forwarding devices 110a and 110b are directly connected to the routing device 122 via their respective upward ports 118a and 118b. The upward port 118c of the packet forwarding device 110c is connected to the downward port 114f of the packet forwarding device 110b. The packet forwarding device 110b and the packet forwarding device 110c are therefore connected in a "cascaded" arrangement. As a result, packets traveling between the routing device 122 and the packet forwarding device 110c must also pass through the packet forwarding device 110b. The downward port 114f of the packet forwarding device 110b can be referred to as a cascade port, because it is connected to the cascaded packet forwarding device 110c rather than a host device 102. The cascaded arrangement of the packet forwarding devices 110b and 110c can allow more host devices 102 to be connected to the routing device 122 than would be possible with only the packet forwarding device 110b, because the packet forwarding device 110c provides additional downstream ports 114 that can each be connected to an additional host device 102. In some implementations, the system 100 can include more than two levels of cascaded packet forwarding devices 110. For example, the system 100 can include three, four, five, or more levels of cascaded packet forwarding devices 110.

In some implementations, the downward port 114f can be a dedicated cascade port (i.e., a port that should only be connected to a cascaded packet forwarding device 110 such as the packet forwarding device 110c, and should not be connected directly to a host device 102). In some other implementations, any of the downward ports 114 of the packet forwarding device 110b can be configured as a cascade port, and the selection of the downward port 114f to serve as a cascade port can be arbitrary. For example, the packet forwarding device 110b can maintain a table indicating which of its downward ports 114 is a cascade port. When a packet forwarding device 110 is coupled to a downstream port 114, the table can be updated to indicate that the downward port 114 to which the cascaded packet forwarding device 110 is connected is a cascade port. Maintaining information corresponding to the downward port 114 that serves as a cascade port can assist with the processing of packets received from the routing device 122, as described further below.

Each host device 102 is connected to a respective downward port 114 of one of the packet forwarding devices 110. While, each packet forwarding device 110 is shown as including three downward ports 114, it should be understood that this configuration is illustrative only. In other implementations, each packet forwarding device 110 may include a larger number of downward ports 114. For example, in some implementations, each packet forwarding device 110 can include 16, 32, 64, or 128 downward ports 114. In some implementations, each packet forwarding device 110 can include up to 255 downward ports 114.

The packet forwarding devices 110 can be configured to provide port-level control of network traffic between the routing device 122 and the host devices 102, such that the routing device 122 can be certain of which downward port 114 an incoming packet arrived from. This can allow the routing device 122 to trace the source of a packet, which can provide improved security in the system 100. For example, if the routing device 122 receives a packet containing a malicious payload, the host device 102 from which the malicious packet was sent can be identified. Identifying the host device 102 can allow corrective action to be taken, such as removing that host device 102 from the system 100 or repairing the host device 102. The packet forwarding devices 110 also can be configured to allow the routing device 122 to select which downward port 114 an outgoing packet will egress. In some implementations, this can allow the routing device 122 to implement load balancing within the system 100.

To allow the routing device 122 to ascertain the provenance of incoming packets and to select the downward port 114 that each outgoing packet will egress, each downward port 114 of the packet forwarding devices 110 can be associated with one or more MAC addresses. For example, each downward port 114 that is directly connected to a host device 102 can be associated with a unique MAC address assigned to that downward port 114. The MAC address assigned to a downward port 114 can be unique not only with respect to the MAC addresses of the other downward ports 114 on the same packet forwarding device 110, but also with respect to the downward ports 114 of the other packet forwarding devices 110. Each host device 102 can be configured to address packets directed towards a packet forwarding device 110 with a destination MAC address that matches the respective downward ports 114 to which the host devices 102 are connected. In contrast to the packet forwarding devices 110a, a typical network node, such as a switch, generally has a single MAC address, and host devices address packets directed to the node with the same destination MAC address regardless of which ports the host devices are connected to. Because each host device 102 in the system 100 is connected to a respective downward port 114 and each downward port 114 directly connected to a host device 102 is assigned a unique MAC address, a packet arriving at the routing device 122 via the packet forwarding devices 110 can be determined to have originated from a particular host device 102, based on the destination information contained in the header of the packet.

In some implementations, the MAC address assigned to a downward port 114 of a packet forwarding device 110 can be based on information uniquely identifying the packet forwarding device 110 from the other packet forwarding devices 110, and information uniquely identifying the downward port 114 from the other downward ports 114 on that packet forwarding device 110. For example, in some implementations, the information uniquely identifying each packet forwarding device 110 (sometimes referred to as a device ID) can be an IPv4 address associated with the packet forwarding device 110. In some other implementations, other identifying information can be used to distinguish the each packet forwarding device 110. For example, the packet forwarding devices 110 can be distinguished from one another by values such as serial numbers, or by another hardware address such as a MAC address associated with each packet forwarding device 100. In some implementations, the information uniquely identifying the downward ports 114 on each packet forwarding device 110 can be an arbitrary number that is unique to each downward port 114 on a given packet forwarding device 110, but may not be unique from the number assigned to a downward port 114 of a different packet forwarding device 110. For example, a downward port 114 can be uniquely identified by an integer between one and the number of ports on the packet forwarding device 100. In some implementations, each port may be assigned an integer between 1 and 255.

In some implementations, the set of information uniquely identifying a downward port 114 from every other downward port 114 in the system 100 (i.e., the information uniquely identifying the packet forwarding device 110 from the other packet forwarding devices 110 plus the information uniquely identifying the downward port 114 from the other downward ports 114 on that packet forwarding device 110) can take the form of a MAC address assigned to each downward port 114 that is directly connected to a host device 102. Because this set of information is unique to each downward port 114 in the system 100, such MAC addresses also can be unique within the system 100. For example, in some implementations, the MAC address assigned to a downward port 114 can be based on the IP address assigned to the packet forwarding device 110 on which the downward port 114 is located, and a number uniquely identifying the downward port 114 from among the other downward ports on that packet forwarding device 110.

In some implementations, the MAC address assigned to a downward port 114 can include the IP address assigned to the packet forwarding device 110 on which the downward port 114 is located and the number uniquely identifying the downward port 114 from among the other downward ports 114 on that packet forwarding device 110. Typically, a MAC address is a 48-bit number that can be expressed as a string of 12 hexadecimal digits. In some implementations, the first two hexadecimal digits of a MAC address may be limited to certain values. The MAC address assigned to a downward port 114 can include any valid values for the first two hexadecimal digits. For example, valid values for the first two hexadecimal digits of the MAC address assigned to a downward port 114 may include 02 or 0E. The next eight hexadecimal digits of the MAC address assigned to a downward port 114 can correspond to the IPv4 address of the packet forwarding device 110 on which the downward port 114 is located, and the last two hexadecimal digits can be a number between one and the number of downward ports 114 supported by the packet forwarding device 110. In this example, the first ten hexadecimal digits of the MAC addresses assigned to the downward ports 114 of a particular packet forwarding device 110 will be identical, and can serve as a common prefix for all of the downward ports 114 of a that packet forwarding device 110. The last two hexadecimal digits will be different on each downward port 114 of that packet forwarding device 110.

In some implementations, downward ports 114 that are connected to other packet forwarding devices 110 in a cascaded fashion rather than directly connected to host devices 102 (such as the downward port 114*f* which is connected to the packet forwarding device 110*c*) may not be assigned a respective MAC address. Instead, such downward ports 114 can be associated with the MAC addresses of the downward ports 114 of the cascaded packet forwarding device 110 to which they are connected. For example, the downward port 114*f* may not be assigned its own MAC address, but may be associated with the MAC addresses of the downward ports 114*g*-114*i* of the cascaded packet forwarding device 110*c*. In some implementations, a downward port 114 may be associated with the MAC addresses of all of the downward ports 114 in a multilevel cascade of packet forwarding devices 110. Thus, in general, a given downward port 114 can be associated with one or more MAC addresses which may include a unique MAC address assigned to that downward port 114 as well as the MAC addresses of downward ports 114 on cascaded packet forwarding devices 110 that are connected to that downward port 114.

In some implementations, the packet forwarding devices 110 can process packets according to a set of rules selected to allow an upstream device, such as the routing device 122, to determine the provenance of each packet transmitted from the host devices 102 to the upstream device. These rules, which can be based in part on the MAC addresses associated with the downward ports 114 through which packets are transmitted, are discussed further below.

In some implementations, the packet forwarding devices 110 can be configured to allow the routing device 122 to select the downward port 114 that a packet transmitted from the routing device 122 will egress. For example, the routing device 122 can be configured to generate packets destined for the host device 102*a* such that a source MAC address of the generated packets matches the MAC address assigned to the downward port to which the host device 102*a* is connected (i.e., the downward port 114*a*). The packet forwarding device 110*a* can be configured to determine that the source MAC address of the packet received from the routing device 122 is associated with (e.g., matches) the MAC address assigned to the downward port 114*a*, and can forward the packet via the downward port 114*a*, responsive to that determination. If the packet forwarding device 110*a* determines that the source MAC address of the packet received from the routing device 122 is not associated with any of the downward ports 114*a*-114*c*, the packet forwarding device 110*a* can be configured to drop the packet. Thus, in this example, the packet forwarding device 110*a* forwards a packet based on the source MAC address of the packet, and drops packets whose source MAC address is not associated with any of its downward ports 114*a*-114*c*. This can help to prevent attacks by a device that creates a packet with a source MAC address that is forged to match the address of the routing device 122 and a destination MAC address of one of the host devices 102. Such a packet will be dropped, as the source MAC address will not be a MAC address associated with any of the downward ports 114 of the packet forwarding device 110.

Figure 1B:
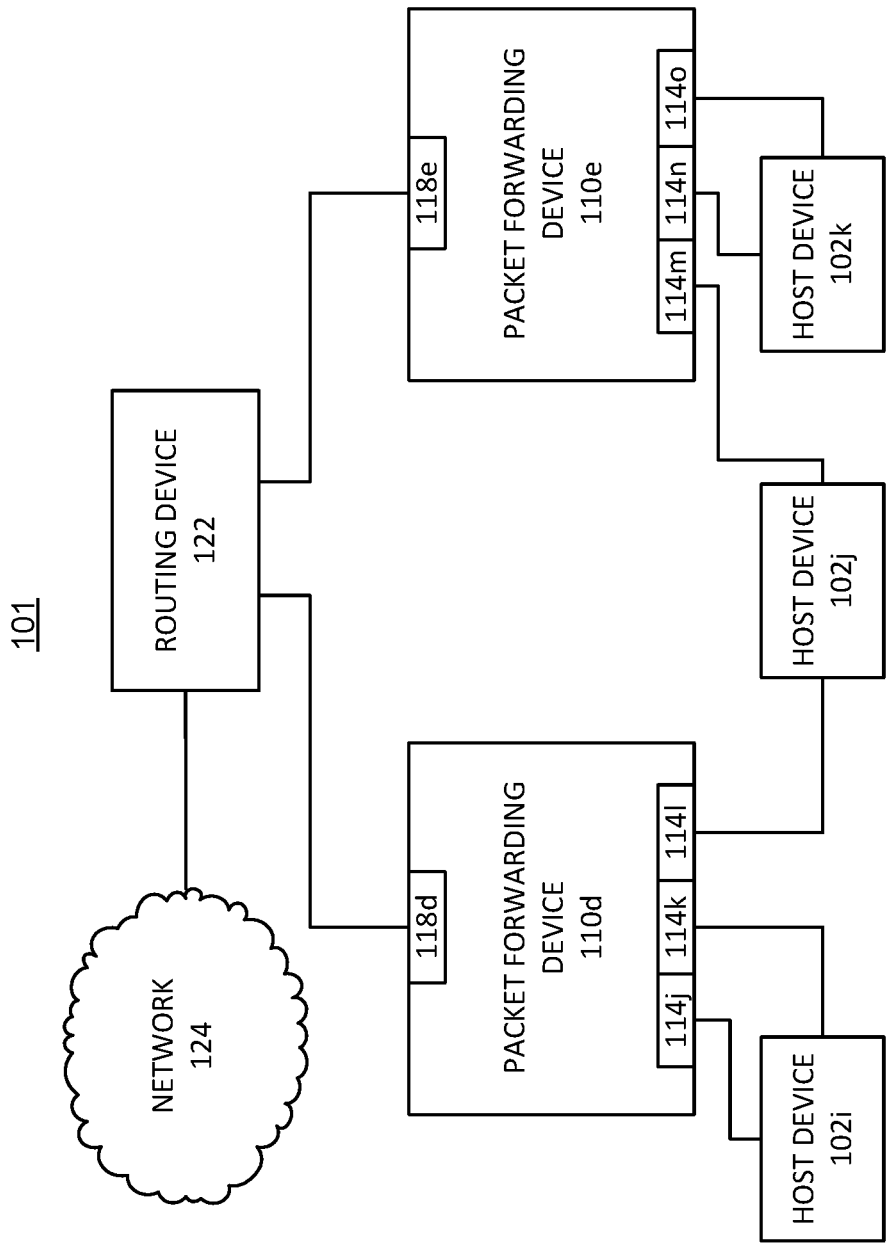
FIG. 1B is a block diagram of another example system for forwarding packets.

FIG. 1B is a block diagram of another example system 101 for forwarding packets. Like the system 100 shown in FIG. 1, the system 101 includes the routing device 122, which is connected to the network 124. The system 101 also includes three host devices 102*i*-102*k* (generally referred to as host devices 102) and two packet forwarding devices 110*d* and 110*e* (generally referred to as packet forwarding devices 110). The packet forwarding devices 110*d* and 110*e* are similar to the packet forwarding devices 110*a*-110*c* shown in FIG. 1, and the host devices 102*i*-102*k* are similar to the host devices 102 shown in FIG. 1. For example, the packet forwarding device 110*d* includes three downward ports 114*j*-114*l* and one upward port 118*d*, and the packet forwarding device 110*e* includes three downward ports 114*m*-114*o* and one upward port 118*e*. The downward ports 114*j*-114*o* are generally referred to as downward ports 114, while the upward ports 118*d* and 118*e* are generally referred to as upward ports 118.

The packet forwarding devices 110*d* and 110*e* are directly connected to the routing device 122 via their respective upward ports 118*d* and 118*e*. The system 101 differs from the system 100 shown in FIG. 1 in that there are multiple paths in the system 101 between each host device 102 and the routing device 122. For example, the host device 102*i* can be reached via the downward port 114*j* or the downward port 114*k*, the host device 102*j* can be reached via the downward port 114*l* or the downward port 114*m*, and the host device 102*k* can be reached via the downward port 114*n* or the downward port 114*o*. As discussed above in connection with FIG. 1A, each downward port 114 that is directly connected to a host device 102 assigned a unique MAC address.

The unique MAC addresses assigned to the downward ports 114 can allow the routing device 122 to select a particular path to each host device 102. For example, as discussed above, the routing device 122 can be configured to generate a packet whose source MAC address matches the MAC address of the downward port 114 through which the packet should egress. Therefore, the routing device 122 can select a particular route for a packet by setting the source MAC address of the packet to the MAC address of the downward port 114 that lies along the desired route.

In some implementations, the routing device 122 can select a route based on a load balancing scheme. For example, the routing device 122 can selectively route a packet or a flow of packets to the host device 102i via the packet forwarding device 110d through either the downward port 114j or the downward port 114k by specifying the desired port's identifier in the corresponding packet's source MAC address field. Doing so can help prevent either of the downward ports 114j and 114k from becoming congested. The above functionality can be particularly valuable in hierarchical networks having more complex switch fabrics (e.g., datacenter networks) that provide multiple routes between aggregation nodes and various server racks.

It should be understood that the topology of the system 101 is illustrative only. For example, in some implementations, the system 101 can include additional packet forwarding devices 110, some of which can be arranged in a cascaded fashion. Each host device 102 also may be connected to more than two downward ports 114, or only a single downward port 114.

Each packet forwarding device 110 in the system 100 shown in FIG. 1A and the system 101 shown in FIG. 1B can generally include any type of device capable of communicating with other devices (e.g., other packet forwarding devices 110). For example, each packet forwarding device 110 may be a computer, a router, a switch, a server, or any combination of these elements. Similarly, the host devices 102 and the routing device 122 also can be a computer, a router, a switch, a server, or any combination of these elements. The packet forwarding devices 110, the host devices 102, and the routing device 122 can each include at least one processor, a memory, and a network interface card. In some implementations, the network 124 can be the Internet, and the system 100 can represent a datacenter connected to the Internet. For example, the host devices 102 can be configured to store data hosted by the datacenter and to receive and respond to requests for data via the packet forwarding devices 110 and the routing device 122. In general, datacenters may support a wide range of computer network traffic, including traffic associated with real-time content delivery, cloud computing services accessed by users of personal or mobile computers, data storage, data indexing, data backup, bulk data transfer, and data access. In some other implementations, the system 100 can represent an enterprise network connected to the internet or another external network.

Figure 2:
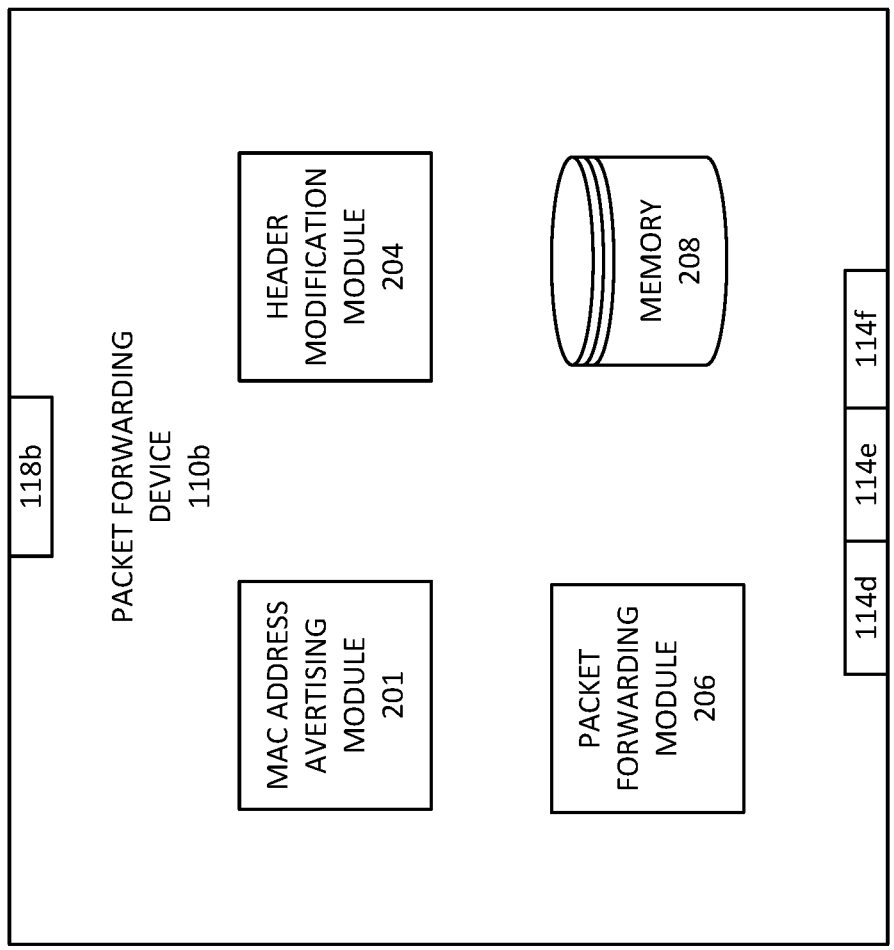
FIG. 2 is block diagram of an example packet forwarding device shown in FIG. 1A.

FIG. 2 is block diagram of the example packet forwarding device 110b shown in FIG. 1A. As discussed above, the packet forwarding device 110b includes downward ports 114d-114f (generally referred to as downward ports 114) and an upward port 118b. The packet forwarding device 110b also includes a MAC address advertising module 201, a header modification module 204, a packet forwarding module 206, and a memory 208.

In some implementations, the MAC address advertising module 201 can be configured to send to each device connected to a downward port 114 information indicating the unique MAC address of the downward ports 114 that are directly connected to host devices. For example, the MAC address advertising module 201 can send the MAC addresses associated with the downward ports 114d and 114e to the devices connected to those ports, respectively.

In some implementations, the MAC address advertising module 201 can be configured to send the appropriate MAC addresses to the respective downward ports 114 in response to receiving a request from the devices connected to the downward ports 114. For example, the MAC address advertising module 201 can be configured to respond to address resolution protocol (ARP) requests received from connected host devices. For example, a device connected to a downward port 114d can send an ARP request to the packet forwarding device 110b. The MAC address advertising module 201 can respond to the ARP request by transmitting information corresponding to the MAC address of the downward port 114d to the device that is connected to the downward port 114d. ARP requests can be received and processed from the devices connected to the downward port 114e. Therefore, devices connected to different downward ports 114 of the packet forwarding device 110b can receive different responses to ARP requests. In contrast, typical network devices are configured to respond to ARP requests with a single address, regardless of the port to which the device initiating the ARP request is connected. The MAC address advertising module 201 can further be configured to advertise the MAC addresses of its downward ports 114 via its upstream port 118b. As discussed above, the downstream port 114f, which is connected to another packet forwarding device 110c rather than to a host device 102 as shown in FIG. 1A, may not be assigned a MAC address, but may be associated with the MAC addresses of the downward ports 114 of other packet forwarding devices coupled to the packet forwarding device 110b in a cascaded fashion, such as the downward ports 114 of the packet forwarding device 110c shown in FIG. 1A. The MAC address advertising module may therefore also be configured to advertise the MAC addresses of these ports via its upstream port 118b.

The packet forwarding module 206 can be configured to forward packets based on a set of rules discussed below in connection with FIGS. 3 and 4. For example, for a packet received directly from a host device via a downward port 114, the packet forwarding module 206 can be configured to determine whether the destination MAC address of a received is associated with the downward port 114 on which the packet was received. In some implementations, the MAC addresses associated with each downward port 114 can be stored in the memory 208. The packet forwarding module 206 can retrieve that information from the memory 208, and can compare the destination MAC address of a packet received via a downward port 114 to that information to determine whether to forward the packet via the upward port 118.

The header modification module 204 can be configured to modify information contained within the header of a packet received by the packet forwarding device 110b. In some implementations, it may be necessary to modify packet header information in order to allow an upstream device, such as routing device 122 shown in FIG. 1A, to determine the provenance of a packet arriving from downstream (e.g., the set of downward ports 114 of packet forwarding devices 110 that the packet passed through). For example, in some implementations, a host device can transmit a packet having a destination MAC address that identifies the packet as a broadcast or multicast packet. However, if that packet is received by the routing device unchanged after passing through the packet forwarding device 110*b*, the routing device will have no way of determining the downward port 114 through which the packet traveled. To address this issue, the header modification module 204 can be configured to determine whether a packet received from one of the downward ports 114 is a broadcast or multicast packet, and if so, to modify the header of the packet. The header of the packet can be modified to include a destination MAC address matching the destination MAC address assigned to the downward port 114 on which the packet was received, so that the routing device can determine the provenance of the packet by examining the destination MAC address field of the packet.

In some implementations, the packet forwarding module 206 can be configured to determine the destination MAC address of the received packet, and to compare the destination MAC address to a list of destination MAC addresses associated with broadcast and multicast packets. For example, such a list can be maintained in the memory 208. If a received packet is a broadcast or multicast packet, the packet forwarding module 206 can send the packet to the header modification module 204, which can be configured to change the destination field contained within the header of the packet to match the MAC address assigned to the downward port 114 on which the packet was received. The packet forwarding module 206 can send the modified packet to the routing device. When the modified packet is received by the routing device, the routing device can determine the downward port 114 through which the packet traveled by examining the destination field of the received packet.

In some implementations, the packet forwarding module 206 can determine whether to forward a packet received via a cascaded downward port 114. For example, the packet forwarding device 110*b* can store a list of MAC addresses associated with the downward ports 114 of all of the cascaded packet forwarding devices 110 that are positioned between the downward ports 114*d*-114*f* of the packet forwarding device 110*b* and one or more host devices 102. Such a list can be stored, for example, in the memory 208. The packet forwarding module 206 can be configured to compare the destination MAC address of a packet received via a downward port 114 to the MAC addresses stored in the list. If a match is determined, the packet forwarding module 206 can forward the packet via the upstream port 118*b*. If a match is not determined, the packet can be dropped. In some other implementations, the packet forwarding device 110*b* can store a list of the common prefixes of MAC addresses associated with the downward ports 114 of all of the cascaded packet forwarding devices 110 that are positioned between the downward ports 114*d*-114*f* of the packet forwarding device 110*b* and one or more host devices 102. As discussed above, a common prefix can be a portion of the MAC addresses (i.e., the first ten hexadecimal digits) that is identical across all of the downward ports 114 of a packet forwarding device 110. Thus, the packet forwarding module 206 can determine whether to forward a packet received via a cascaded downward port 114 more efficiently by determining a match between the prefix of the destination MAC address of a received packet and the common prefix of a cascaded packet forwarding device 110, rather than by determining a match between the entire destination MAC address of the received packet and the unique MAC address associated with a downward port 114 on any of the cascaded packet forwarding devices 110.

In some implementations, the packet forwarding module 206 can be configured to forward a packet received directly from an upstream device, such as the routing device 122 shown in FIG. 1A or another packet forwarding device 110, via a downward port 114. For example, the packet forwarding module 206 can be configured to determine whether the source MAC address of the received packet is associated with any downward port 114. In some implementations, the MAC addresses associated with each downward port 114 can be stored in the memory 208. The packet forwarding module 206 can retrieve that information from the memory 208, and can compare the source MAC address of a packet received via the upward port 118 to that information. If a match is determined, the packet forwarding module 206 can be configured to forward the received packet via the downward port 114 associated with the source MAC address of the received packet. For example, an association may be determined if a MAC address of a downstream port 114 matches the source MAC address of the received packet, or if the downstream port 114 is connected to another packet forwarding device 110 having a downward port whose MAC address matches the source MAC address of the received packet. Therefore, for a packet received from an upstream device, the packet forwarding module 206 can forward the packet via the appropriate downward port 114 responsive to determining match between the source address of the received packet and a MAC address associated with the cascaded downward port 114. In some implementations, the downward port 114 can be a cascaded downward port 114 that is connected to another packet forwarding device 100 having a downward port whose MAC address matches the source MAC address of the received packet. If no match is determined, the packet forwarding module 206 can be configured to drop the packet.

In some other implementations, the packet forwarding module 206 can forward a packet to a cascaded packet forwarding device 110, responsive to determining that the source MAC address of the packet does not match the MAC address assigned to any of the downward ports 114 that are directly connected to host devices, without determining that the source MAC address of the packet matches the source MAC addresses associated with the downward ports 114 of all of the cascaded packet forwarding devices that are positioned between the downward ports 114*d*-114*f* of the packet forwarding device 110*b* and one or more host devices 102. When the packet reaches the last packet forwarding device 110 in the cascade, that packet forwarding device can determine whether to drop the packet or forward the packet, based on its own examination of the source MAC address of the packet.

In some implementations, the MAC address advertising module 201, the header modification module 204, and the packet forwarding module 206 each can be implemented as special purpose logic circuitry, such as a field programmable gate array (FPGA) or an application-specific integrated circuit (ASIC). In other implementations, the MAC address advertising module 201, the header modification module 204, and the packet forwarding module 206 may be implemented as one or more software modules stored on a computer readable medium and which are executed on one or more general purpose processors. In some implementations, the functionality of some or all of the MAC address advertising module 201, the header modification module 204, and the packet forwarding module 206 may be combined into a single module or be further subdivided into smaller modules. The packet forwarding device 110*b* can also include other communication hardware not illustrated in FIG. 2, such as a network interface card, additional memory modules, and input/output devices.

It should be understood that any of the packet forwarding devices 110 included in the system 100 shown in Figures 1A and 1B can include modules similar to those described above in connection with the packet forwarding device 110*b*. For example, the packet forwarding device 110*a* and the packet forwarding device 110*d* each can include a respective MAC address advertising module 201, a respective header modification module 204, a respective packet forwarding module 206, and a respective memory 208. The modules included in other packet forwarding devices 110 can operate in a manner similar to that discussed above in connection with the modules of the packet forwarding device 110*b*.

Figure 3:
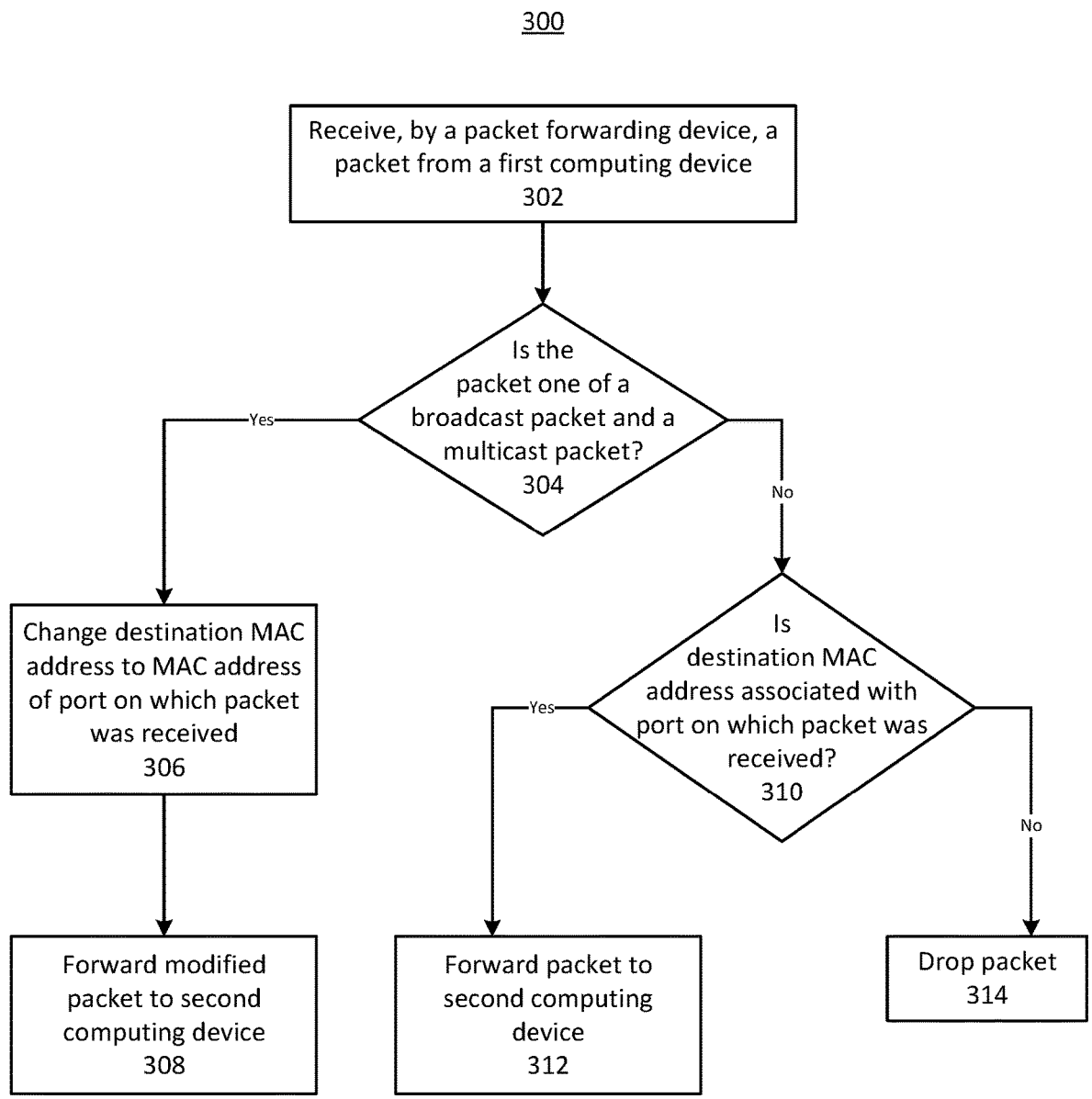
FIG. 3 is a flowchart illustrating an example process for forwarding packets.

FIG. 3 is a flowchart illustrating an example process 300 for forwarding packets. In some implementations, the process 300 can be used for processing packets received by a packet forwarding device, such as the packet forwarding devices 110 shown in FIG. 1A and FIG. 1B, from a computing device such as any of the host devices 102 shown in FIG. 1A and FIG. 1B. In brief overview, the process 300 includes receiving, by a packet forwarding device, a packet from a first computing device (stage 302). The process 300 includes determining whether the received packet is one of a broadcast packet and a multicast packet (stage 304). If the packet is a broadcast packet or a multicast packet, the process 300 includes changing a destination MAC address of the packet to the MAC address of the port on which the packet was received (stage 306), and forwarding the modified packet to a second computing device (stage 308). If the packet is neither a broadcast packet nor a multicast packet, the process 300 includes determining whether a destination MAC address of the packet is associated with the port on which the packet was received (stage 310). If the destination MAC address of the packet is associated with the port on which the packet was received, the process 300 includes forwarding the packet to the second computing device (stage 312). If the destination MAC address of the packet is not associated with the port on which the packet was received, the process 300 includes dropping the packet (stage 314).

Referring again to FIG. 3, the process 300 includes receiving, by a packet forwarding device, a packet from a first computing device (stage 302). In some implementations, the first computing device can be a host device, such as any of the host devices 102 shown in FIG. 1A and FIG. 1B, and can be connected to the packet forwarding device via a downward port of the packet forwarding device. In some other implementations, the first computing device can be another packet forwarding device that is positioned between the first packet forwarding device and a host device. In still other implementations, the first computing device can be a computing device that may be attempting to impersonate one of the host devices, for example by forging (or spoofing) the source MAC address of the packet to match the source MAC address of one of the host devices. The process 300 can be used to drop packets that are not properly directed at an upstream routing device, such as the routing device 122 shown in FIG. 1A and FIG. 1B, and to enable the routing device to determine the provenance of packets that are forwarded by the packet forwarding device.

The process 300 includes determining whether the received packet is one of a broadcast packet and a multicast packet (stage 304). In some implementations, certain destination MAC addresses may be reserved for broadcast or multicast packets which can be used, for example, without limitation, in security negotiations between networking devices, ARP requests, router discovery, or routing protocol advertisements. If the packet is determined to be a broadcast packet or a multicast packet, the process 300 includes changing a destination MAC address of the packet to the MAC address of the port on which the packet was received (stage 306). If a broadcast packet or a multicast packet were to be forwarded unchanged to the routing device, the routing device may not be able to determine the specific host device from which the packet originated or the downward port of the packet forwarding device through which the packet was received. For example, another host device could have spoofed the source IP and source MAC addresses used in the packet. To address this issue, the packet forwarding device can modify the destination field of the packet to contain the MAC address of the downward port on which the packet arrived. In some implementations, the contents of the packet can still indicate that the packet is a multicast or broadcast packet, even though the destination MAC address has been modified by the packet forwarding device.

The process 300 includes forwarding the modified packet to a second computing device (stage 308). In some implementations, the second computing device can be the routing device 122 shown in FIG. 1A and FIG. 1B. As discussed above, each downward port of the packet forwarding device coupled directly to a host can have a unique MAC address. Thus, when the second computing device receives the modified packet, the second computing device can determine the downward port through which the packet traveled by examining the modified destination MAC address of the received packet.

If the packet is neither a broadcast packet nor a multicast packet, the process 300 includes determining whether the destination MAC address of the packet is associated with the port on which the packet was received (stage 310). The determination can be made, for example, by comparing the destination MAC address of the received packet with the MAC addresses associated with the port on which the packet was received. If the destination MAC address of the packet is associated with the port on which the packet was received, the process 300 includes forwarding the packet to the second computing device (stage 312). In some implementations, packets received via a cascaded downward port (i.e., a downward port that is connected to another packet forwarding device) are forwarded via the upstream port without inspection, as the packet would have been appropriately processed by the cascaded packet forwarding device before the cascaded packet forward device had forwarded the packet.

In some implementations, forwarding the packet on the basis of determining that the destination MAC address of the packet is associated with the downward port on which the packet was received can help to prevent attacks by devices that may be attempting to impersonate a host device. For example, in some implementations the host devices are configured to generate packets destined for the second computing device such that a destination MAC address of the packets matches the MAC address of the downward port of a packet forwarding device to which the host devices are respectively connected. Thus, if the destination MAC address of the packet is not associated with the port on which the packet was received, the packet forwarding device can determine that the packet did not originate from a corresponding host device, and can drop the packet (stage 314). As such, a packet whose source MAC address is forged to match the address of a host device will not be forwarded unless the packet also includes the correct destination MAC address (i.e., a MAC address associated with the downward port on which the packet is received by the packet forwarding device). Similarly, a packet received on a downward port having a source MAC address that is forged to match the address of an upstream device also will not be forwarded, unless the packet also includes the correct destination MAC address (i.e., a MAC address associated with the downward port on which the packet is received by the packet forwarding device). The likelihood of a packet with a forged source MAC address reaching the second computing device is therefore reduced.

In some implementations, forwarding the packet on the basis of determining that the destination MAC address of the packet is associated with the downward port on which the packet was received can allow an upstream device, such as the routing device 122 shown in FIG. 1A a, to identify the source of a malicious packet. For example, if the upstream device receives a packet containing a malicious payload (e.g., generated as a result of a virus infection), the host device from which the malicious packet was sent can be identified based on the destination MAC address of the packet, and a corrective action can be performed to remove or repair the host device.

Figure 4:
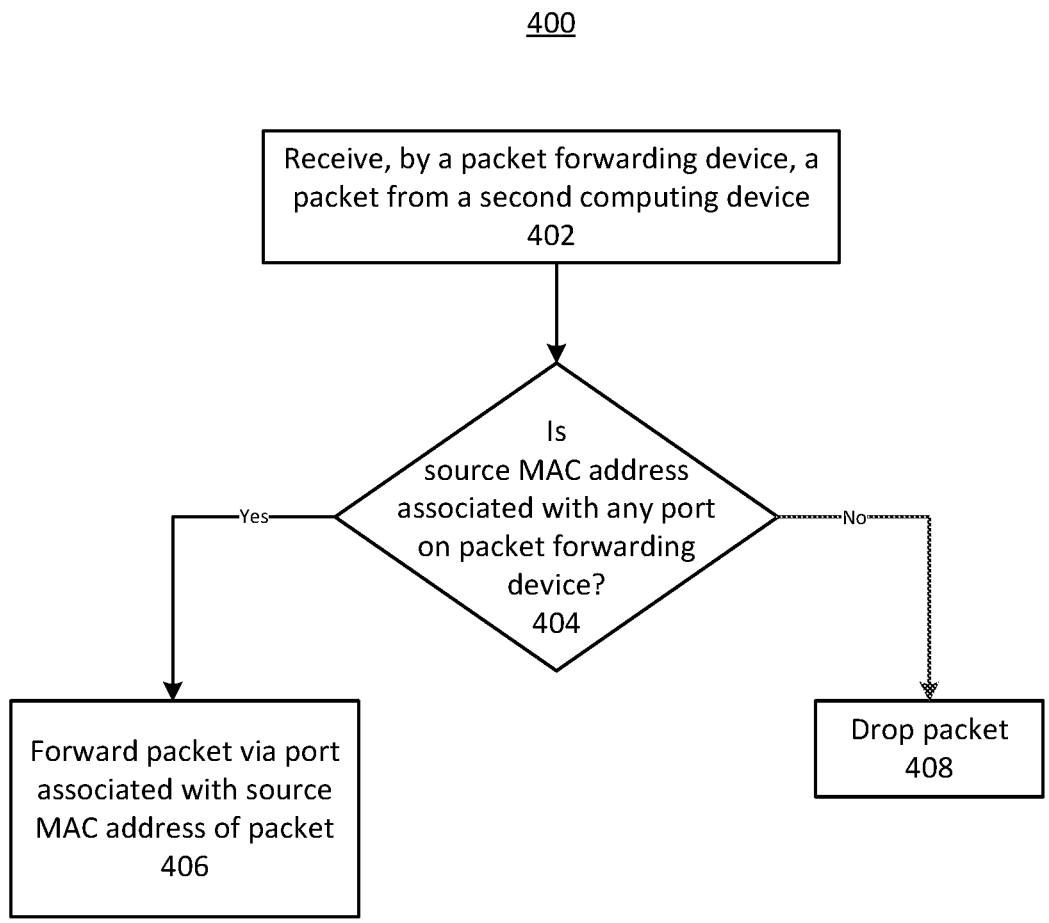
FIG. 4 is a flowchart illustrating another example process for forwarding packets.

FIG. 4 is a flowchart illustrating another example process 400 for forwarding packets. In some implementations, the process 400 can be used for processing packets received by a packet forwarding device, such as the packet forwarding devices 110 shown in FIG. 1A and FIG. 1B, from a computing device such as the routing device 122 shown in FIG. 1A and FIG. 1B. In brief overview, the process 400 includes receiving, by a packet forwarding device, a packet from a second computing device (stage 402). The process 400 includes determining whether a source MAC address of the packet is associated with any downward port of the packet forwarding device (stage 404). If the source MAC address of the packet is associated with a downstream port of the packet forwarding device, the process 400 includes forwarding the packet via the downward port whose MAC address matches the source MAC address of the packet (stage 406). If the source MAC address of the packet is not associated with a downstream port of the packet forwarding device, the process 400 includes dropping the packet (stage 408).

Referring again to FIG. 4, the process 400 includes receiving, by a packet forwarding device, a packet from a second computing device (stage 402). In some implementations, the second computing device can be a routing device upstream from the packet forwarding device, such as the routing device 122 shown in FIG. 1A and FIG. 1B, and can be connected to the packet forwarding device via an upward port of the packet forwarding device. In some other implementations, the second computing device can be a cascaded packet forwarding device. The process 400 can be used to enable the upstream routing device to select a port of the packet forwarding device through which the packet will egress.

The process 400 includes determining whether a source MAC address of the packet is associated with any downward port of the packet forwarding device (stage 404). The determination can be made, for example, by comparing the source MAC address of the received packet with the MAC addresses associated with each downward port of the packet forwarding device. As discussed above, a downward port may be associated with a MAC address assigned to that downward port, as well as the MAC addresses of downward ports of cascaded packet forwarding devices that are connected to that downward port. If the source MAC address of the packet is associated with a downward port of the packet forwarding device, the process 400 includes forwarding the packet via the downward port that is associated with the source MAC address of the packet (stage 406). Forwarding the packet on the basis of determining an association between the source MAC address of the packet and one of the downward ports of the packet forwarding device can help to prevent attacks by host devices that may be attempting to impersonate another host device. The selection of a downward port through which a packet will egress is made by the upstream routing device, rather than by the packet forwarding device. The packet forwarding device will forward each packet received from the routing device via the downward port whose MAC address is associated with the source MAC address of the packet, regardless of the destination MAC address of the packet. The routing device can select a target host device to receive a packet by setting the source MAC address of the packet to the MAC address associated with the downward port to which the target host device is selected. As a result, another host device that attempts to receive packets destined for the target host device, for example by advertising a MAC address matching the MAC address of the target host device, will be prevented from receiving such packets. In contrast, most networking devices forward packets based on the destination MAC address of the packet, rather than the source MAC address, and are therefore more likely to forward packets to host devices that maliciously impersonate a target host device.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A system comprising:
   one or more first computing devices;
   a second computing device; and
   a packet forwarding device configured to:
      receive a first packet from one of the one or more first computing devices at a first port;
      access, from memory of the packet forwarding device, a list of MAC identifiers identifying addresses associated with ports of the packet forwarding device that are connected to one of the one or more first computing devices;
      determine whether a destination MAC address of the first packet corresponds to an identifier of the list identifying an address associated with a port of the packet forwarding device that is connected to one of the one or more first computing devices;
      forward the first packet to the second computing device, responsive to a determination that the destination MAC address of the first packet corresponds to an identifier of the list identifying an address associated with a port of the packet forwarding device that is connected to one of the one or more first computing devices; and
      drop the first packet, responsive to a determination that the destination MAC address of the first packet does not correspond to any identifier of the list identifying an address associated with a port of the packet forwarding device that is connected to one of the one or more first computing devices;
      receive a second packet from the second computing device;
      determine whether a source MAC of the second packet is associated with any first port of the packet forwarding device that is connected to one of the one or more first computing devices; and
      forward the second packet, responsive to a determination that the source MAC address of the second packet is associated with a first port of the packet forwarding device that is connected to one of the one or more first computing devices, via the first port associated with a source MAC address of the second packet.

2. The system of claim 1, wherein the packet forwarding device is further configured to drop the second packet, responsive to determining that the source MAC address of the second packet is not associated with any port of the packet forwarding device that is connected to one of the one or more first computing devices.

3. The system of claim 1, wherein for a third packet received from one of the one or more first computing devices, the packet forwarding device is configured to:
   determine that the third packet is one of a broadcast packet and a multicast packet;
   change a destination MAC address of the third packet to a MAC address assigned to the first port on which the third packet was received; and
   forward the third packet to the second computing device.

4. The system of claim 1, wherein a MAC address assigned to at least one port of the packet forwarding device is based on an IP address of the packet forwarding device and a number uniquely identifying the at least one port.

5. The system of claim 4, wherein a MAC address assigned to at least one port of the packet forwarding device includes the IP address of the packet forwarding device and the number uniquely identifying the at least one port.

6. The system of claim 1, wherein the packet forwarding device is further configured to:
   determine that a destination MAC address of a fourth packet received from one of the one or more first computing devices is not associated with the first port on which the fourth packet was received and that the destination MAC address of the fourth packet is neither a broadcast MAC address nor a multicast MAC address; and
   drop the fourth packet, responsive to the determination that the destination MAC address of the fourth packet is not associated with the first port on which the fourth packet was received and that the destination MAC address of the fourth packet is neither a broadcast MAC address nor a multicast MAC address.

7. The system of claim 1, further comprising:
a third computing device including a plurality of ports, the third computing device communicatively coupled to a respective first port of the packet forwarding device, wherein the packet forwarding device is further configured to:
  determine that a destination MAC address of a fifth packet received from the third computing device is associated with a device ID of the third computing device; and
  forward the fifth packet to the second computing device, responsive to determining that the destination MAC address of a fifth packet is associated with the device ID of the third computing device.

8. The system of claim 1, wherein the third computing device is configured to:
  determine that a source MAC address of a sixth packet received from the packet forwarding device is associated with the first port of the packet forwarding device to which the third computing device is communicatively coupled; and
  forward the sixth packet via the port of the third computing device that is associated with the source MAC address of the sixth packet.

9. The system of claim 1, wherein the one or more first computing devices are further configured to ensure that each packet destined for the second computing device has a destination MAC address that is associated with the port of the packet forwarding device to which the one or more first computing devices are communicatively coupled.

10. The system of claim 1, wherein the second computing device is further configured to ensure that each packet destined for one of the one or more first computing devices has a source MAC address that is associated with the port of the packet forwarding device to which the destined first computing device is communicatively coupled.

11. A method of processing packets comprising:
  receiving, by a packet forwarding device, a first packet from a first computing device;
  accessing, by the packet forwarding device, a list of MAC identifiers identifying addresses associated with ports of the packet forwarding device that are connected to one of the one or more first computing devices;
  determining, by the packet forwarding device, whether a destination MAC address of the first packet corresponds to an identifier included in the list of one or more identifiers identifying an MAC address associated with a port of the packet forwarding device that is connected to one of the one or more first computing devices;
  forwarding, by the packet forwarding device, the first packet to a second computing device, responsive to the determination that the destination MAC address of the first packet corresponds to an identifier of the list identifying an address associated with a port of the packet forwarding device that is connected to one of the one or more first computing devices;
  dropping, by the packet forwarding device, the first packet, responsive to a determination that the destination MAC address of the first packet does not correspond to any identifier of the list identifying an address associated with a port of the packet forwarding device that is connected to one of the one or more first computing devices;

receiving, by the packet forwarding device, a second packet from a second computing device;
determining whether a source MAC of the second packet is associated with any first port of the packet forwarding device that is connected to one of the one or more first computing devices; and
forwarding, responsive to a determination that the source MAC address of the second packet is associated with a first port of the packet forwarding device that is connected to one of the one or more first computing devices, by the packet forwarding device, the second packet via the port associated with a source MAC address of the second packet.

12. The method of claim 11, further comprising:
determining, by the packet forwarding device, that the source MAC address of the second packet is not associated with any port of the packet forwarding device; and
dropping, by the packet forwarding device, the second packet, responsive to the determination that the source MAC address of the second packet is not associated with any port of the packet forwarding device that is connected to one of the one or more first computing devices.

13. The method of claim 11, further comprising:
receiving, by the packet forwarding device, a third packet to from the first computing device;
determining, by the packet forwarding device, that the third packet is one of a broadcast packet and a multicast packet;
changing, by the packet forwarding device, a destination MAC address of the third packet to a MAC address assigned to the port on which the third packet was received; and
forwarding, by the packet forwarding device, the third packet to the second computing device.

14. The method of claim 11, wherein a MAC address assigned to at least one port of the packet forwarding device is based on an IP address of the packet forwarding device and a number uniquely identifying the at least one port.

15. The method of claim 14, wherein a MAC address assigned to at least one port of the packet forwarding device includes the IP address of the packet forwarding device and the number uniquely identifying the at least one port.

16. The method of claim 11, further comprising:
receiving, by the packet forwarding device, a fourth packet from the first computing device;
determining, by the packet forwarding device, that a destination MAC address of the fourth packet is not associated with the port on which the fourth packet was received and that the destination MAC address of the fourth packet is neither a broadcast MAC address nor a multicast MAC address;
dropping, by the packet forwarding device, the fourth packet, responsive to the determination that the destination MAC address of the fourth packet is not associated with the port on which the fourth packet was received and that the destination MAC address of the fourth packet is neither a broadcast MAC address nor a multicast MAC address.

17. The method of claim 11, further comprising:
receiving, by the packet forwarding device, a fifth packet from a third computing device, wherein the third computing device includes a plurality of ports;
determining, by the packet forwarding device, that a destination MAC address of the fifth packet received from the third computing device is associated with a device ID of the third computing device; and forwarding, by the packet forwarding device, the fifth packet to the second computing device, responsive to determining that the destination MAC address of a fifth packet is associated with the device ID of the third computing device.

18. The method of claim 11, further comprising:

transmitting, by the packet forwarding device, a sixth packet to the third computing device;

determining, by the third computing device, that a source MAC address of a sixth packet received from the packet forwarding device is associated with the port of the packet forwarding device to which the third computing device is communicatively coupled; and forwarding, by the third computing device, the packet via the port of the third computing device that is associated with the source MAC address of the sixth packet.

19. The method of claim 11, further comprising ensuring, by the first computing device, that each packet destined for the second computing device has a destination MAC address that is associated with the port of the packet forwarding device to which the first computing device is communicatively coupled.

20. The method of claim 11, further comprising ensuring, by the second computing device, that each packet destined for the first computing device has a source MAC address that is associated with the port of the packet forwarding device to which the first computing device is communicatively coupled.

* * * * *